United States Patent

Newell

[15] 3,678,393

[45] July 18, 1972

[54] AUTOMATIC GAIN CONTROL HAVING A FAST BROADBAND ATTACK MODE AND A SLOW NARROW BAND RECEIVE MODE

[72] Inventor: John Anthony Newell, Middletown, N.J.

[73] Assignee: Bell Telephone Laboratories, Incorporated, Murray Hill, N.J.

[22] Filed: Sept. 30, 1970

[21] Appl. No.: 76,819

[52] U.S. Cl. ..............................325/410, 325/404, 330/141

[51] Int. Cl. ..........................................................H04b 1/16

[58] Field of Search................178/7.3 R; 325/392, 404, 410, 325/411; 330/138, 141

[56] References Cited

UNITED STATES PATENTS 3,230,458 1/1966 Stangeland ............................325/410

*Primary Examiner*—Albert J. Mayer

*Attorney*—R. J. Guenther and E. W. Adams, Jr.

[57] ABSTRACT

An Automatic Gain Control (AGC) circuit having a fast broadband attack mode and a slow narrow band receive mode. A CODAN-like circuit is employed to judge the quality of the received signal. If the quality is poor, the AGC circuit responds to the total received energy. If the quality is good, a narrow band filter along with suitable damping is switched into the AGC loop so that it responds in a stable mode only to the received carrier energy.

7 Claims, 3 Drawing Figures

INVENTOR
J. A. NEWELL
BY Roy M. Porter Jr.
ATTORNEY

AUTOMATIC GAIN CONTROL HAVING A FAST BROADBAND ATTACK MODE AND A SLOW NARROW BAND RECEIVE MODE

BACKGROUND OF THE INVENTION

This invention relates to Automatic Gain Control Circuits for radio frequency amplifiers of the type used in radio receivers and, more particularly, to circuits having substantially different attack and receive response times.

Automatic Gain Control Circuits (AGC) are well known which monitor the strength of a received signal and adjust the gain of one or more amplifier stages of the receiver to obtain a relatively constant output level. It is also known that it is generally preferable to derive the AGC control signal from the received carrier signal alone so that the presence, absence or variation of modulation on this carrier will not affect the AGC level. These carrier controlled systems require a narrow band filter in the AGC loop to pass the carrier frequency energy and to exclude the sidebands representing the modulation. It is also known that when any narrow band filter is included in a feedback loop, such as is generally required for AGC, the phase shift characteristic of the narrow band filter produces instabilities at the lower frequencies. To avoid this instability the narrow band feedback loop must then be highly damped which means that in an AGC loop the response time is slow and the attack time, that is, the time required for the AGC to bring the gain to the desired level, is long. For these reasons fast attack time and stable carrier control of AGC have appeared to be incompatible objectives in the prior art.

In many systems, however, such as those in which the carrier is turned on and off between transmissions, or in which the carrier is present only when modulation is present as in high seas communication equipment, a fast attack time is required. For example, fast attack is required to scan many potential transmissions, recognize, and then establish a proper receiving level for a given transmission in a very short time. Attempts have been made to use a short time constant circuit in the loop for attack and then switch to a longer time constant circuit for a receiving mode. However, it has been found that if the short time constant circuit is sufficiently short to provide the desired attack time, the system is likely to be unstable at the most critical moment.

SUMMARY OF THE INVENTION

In accordance with the invention the foregoing difficulties are overcome by switching between an attack mode having a short time constant loop but one which is not made unstable by the use of a narrow band carrier filter. Instead, the short time constant is used with a wideband loop operating upon the total received energy including carrier, modulation and noise. Such a circuit can be made inherently stable. After the required level has been approximated in a very short time, a narrow band filter and a high degree of amplitude versus frequency damping at broadband are simultaneously switched into the loop for the receiving mode. Since the wide band loop of the attack mode responds to modulation and noise in addition to the carrier, it is clear that the usual amplitude-sensitive AGC detector would be unsatisfactory as a means for determining when the switch from attack mode to receive mode should be made. It is, therefore, a particular feature of the present invention that this determination is made on the basis of carrier signal-to-noise ratio of the received signal rather than on the basis of total signal amplitude as is customary in known systems.

DETAILED DESCRIPTION

Figure 1:
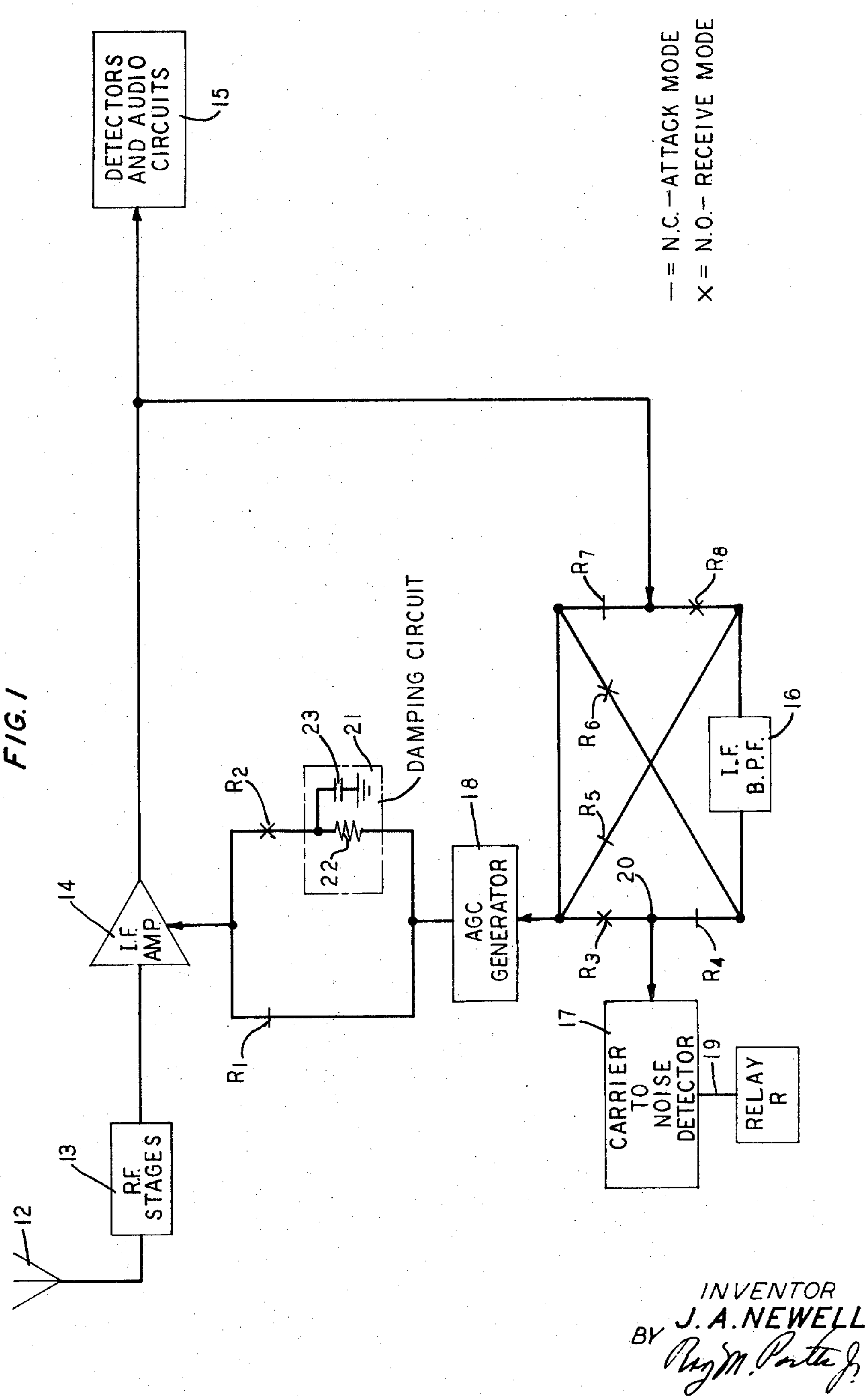
FIG. 1 shows in block diagram form an AGC circuit in accordance with the invention as applied to conventional radio receiver stages.

Referring more particularly to FIG. 1, a basic AGC circuit in accordance with the invention is shown in block diagram form in combination with a conventional radio receiver. The conventional receiver itself comprises an antenna 12, radio frequency stages 13 providing both band limiting and amplification, IF amplification stages 14 adapted for variable gain and detector and audio circuits 15. The AGC loop, in accordance with the invention, is in a feedback form and extends from the output of IF amplifier 14 preceding detector 15. The output of amplifier 14 is applied through a matrix of normally open and normally closed switch contacts $R_3$ through $R_8$ which function, as will be described, to switch an IF passband filter 16 in and out of the AGC loop. At the same time, the switch network delivers the output of filter 16 to a carrier signal-to-noise detector 17 independently of whether or not filter 16 is in the loop. Preferably filter 16 should be a sharply tuned crystal filter and have a narrow band substantially centered on the carrier energy. From the switching network the AGC loop continues to AGC generator 18 which includes the usual rectifier and suitable amplifying circuits to convert the radio frequency IF signal into a direct current control signal of suitable amplitude.

This control signal is then either applied through a damping circuit 21 including resistor 22 and capacitor 23, together having a long time constant, through contact $R_2$ to amplifier 14 or applied directly through contact $R_1$ which bypasses circuit 21 to amplifier 14 to regulate the gain of amplifier 14 in the usual way. The nature of damping circuit 21 and its function in the circuit will be described in detail hereinafter in connection with FIG. 2.

It is sufficient for the present to note that resistor 22 and capacitor 23 are illustrative of a low pass filter connection. Since the current on which they operate is essentially an amplitude varying d.c. signal, the effect of the filter is to reduce the amplitudes of the higher frequencies of these variations. Thus, the response of the d.c. portion of the feedback circuit is damped by increasing its time constant. Thus, circuit 21 may be characterized as a long time constant, high-frequency damping circuit.

The control signal for the loop switching is derived from the output of passband filter 16 at a point 20 between contacts $R_3$ and $R_4$ by way of carrier signal-to-noise detector 17 in such a way that the loop switching may be controlled by the signal-to-noise detector 17 whose state is dependent on the quality of the output signal from band pass filter 16. Detector 17 may take many forms, typical of which is the class of circuits known as CODAN (Carrier Operated Device, Anti-Noise) circuits. Specific circuits which have the advantage of fast response will be mentioned hereinafter. In general, detector 17 compares the carrier power and noise power in the narrow band centered upon the carrier which is passed by filter 16 and produces an indication on lead 19 when the ratio thereof exceeds a predetermined level. The indication on lead 19 operates relay R with which the several contacts $R_1$ through $R_8$ are associated. Those contacts represented by a single bar are normally closed and are employed in the attack mode while those represented by a cross are normally open and are employed in the receive mode. Thus, in the attack mode the IF signal passes through $R_7$ directly to AGC generator 18 and at the same time through $R_5$, filter 16 an $R_4$ to detector 17. Simultaneously, $R_1$ is closed and $R_2$ opened which removes circuit 21 from the loop.

Having thus outlined broadly the circuits of the invention, further attention should be given to the requirements for damping circuit 21 in terms of stability of the feedback loop. It is a well-known principle of the feedback loops that the loop will be stable if the loop gain is less than unity or if the phase of the feedback signal is proper to be degenerative. If both the gain of the loop is greater than unity and the signal phase is regenerative, the loop will oscillate thereby becoming unstable and unsuitable for the present purposes. These principles may be applied to the invention as shown in FIG. 1 with the aid of the characteristics shown in FIG. 2.

First note, however, that the portion of the feedback loop of FIG. 1 preceding AGC generator 18 contains radio frequency energy while the portion following AGC generator 18 contains an essentially d.c. signal varying in amplitude at a relatively low frequency. In accordance with usual feedback loop analysis, the loop is best analyzed as a d.c. network by translating the radio frequency portion of it to baseband. By such a translation the frequency of the carrier becomes zero frequency or d.c. while the frequencies in the sidebands, which represent the intelligence modulation, extend above it. The exact transformation ratio depends, of course, on the parameters of AGC generator 18 and the precise value of the translating factor is not of importance here.

Figure 2:
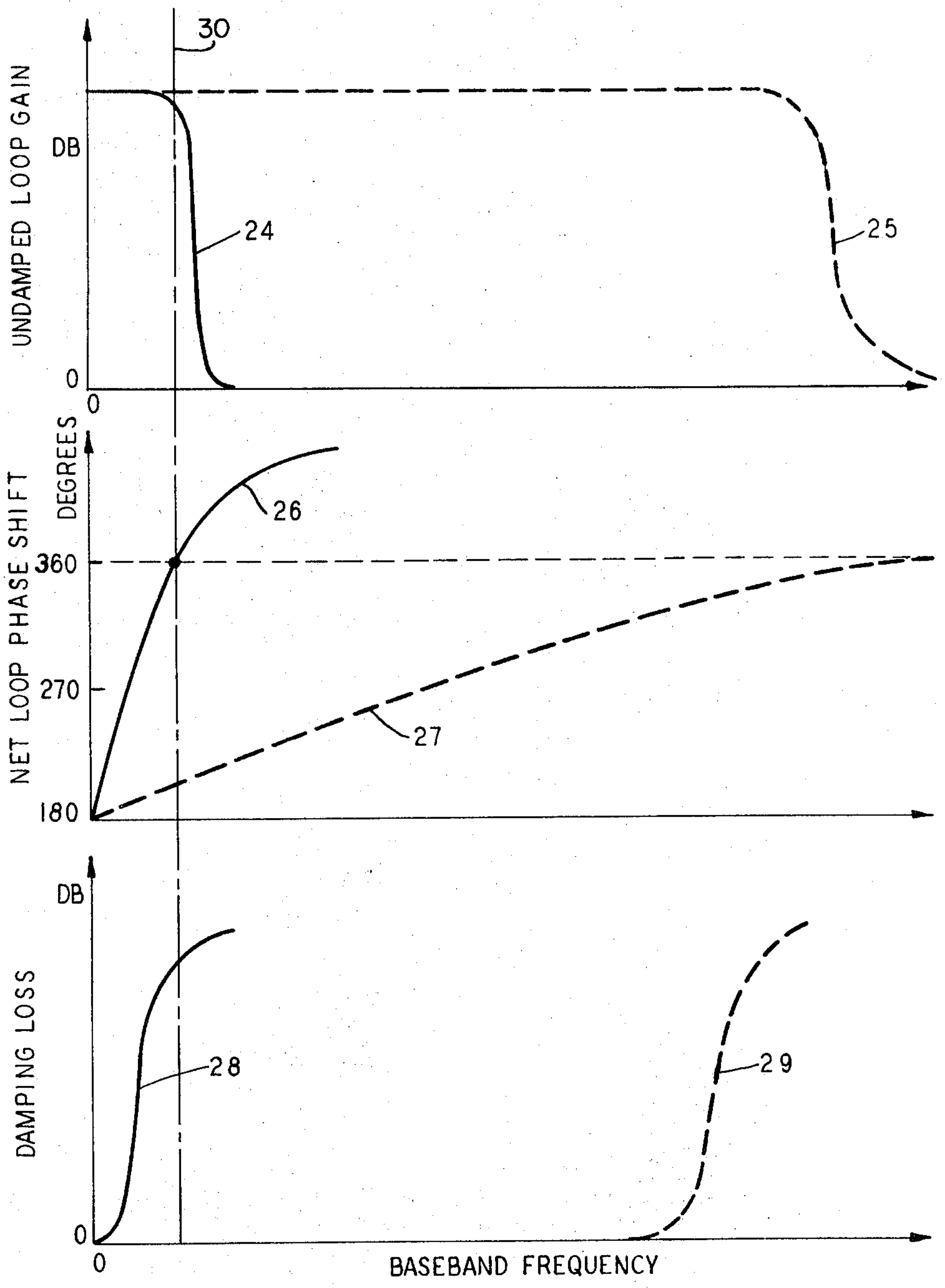
FIG. 2 shows characteristics of gain, phase shift and damping versus frequency for the purpose of explaining the operation of the invention.

Thus, curves 24 and 25 of FIG. 2 represent the undamped loop gain versus baseband frequency with filter 16 and without filter 16, respectively. Similarly, curves 26 and 27 represent the net loop phase shift under the same conditions. Specifically, curve 25 shows that the loop gain in the absence of the filter is broadband and falls off at a frequency near the limits of the intelligence modulation due to the band limiting effects of components not herein of concern. Typical damping due to these band limiting components is represented by curve 29. Correspondingly, the net loop phase shift as shown by curve 27 can be designed to be below that causing regeneration (represented on FIG. 2 by a net phase shift of 360°) within this band. The addition of filter 16, however, interposes its inherent phase versus frequency characteristic into the loop. Typically, such a filter has a 180° phase shift (as compared to 0° at its center frequency) at approximately the points at which its loss characteristic is only 3 d.b. down from the center frequency. Characteristics 24 and 26 represent the net loop amplitude versus frequency and phase versus frequency, respectively, including typical characteristics of filter 16 after being translated to the baseband scale of FIG. 2. Reference line 30 has been drawn through the point at which characteristic 26 passes through 360° and thus intersects characteristic 24 at approximately a point 3 d.b. down from its maximum. Thus, the loop gain of curve 24 is substantially above unity at the frequency for which the net phase shift as shown by curve 26 is regenerative. In accordance with the invention, circuit 21 comprises a low pass filter having an upper frequency roll off or loss characteristic as shown by curve 28, such that the total gain comprising the sum of the gain curve 24 and the loss curve 28 is less than unity at the frequency represented by reference line 30. For example, if the undamped loop gain is 40 d.b. at this frequency, circuit 21 must introduce about 40 d.b. of loss to this same frequency. For this purpose a simple R-C circuit having a series resistance 22 and a shunt capacitor 23 as shown in FIG. 1 and having a total R-C time constant in the order of 10 times the undamped time constant represented by curve 29 will prove satisfactory. The relationship is not critical and herein lies one of the advantages of the invention deriving directly from the fact that the required damping is added at the baseband rather than at radio frequencies. All that is required is that at the frequencies for which the loop might become regenerative, regeneration is limited by dropping the total loop gain below unity.

In operation both filter 16 and damping circuit 21 are removed from the loop so that the IF gain is set rapidly in accordance with stable low time constant characteristics 25, 27 and 29. Continued reception, however, in this mode would seriously degrade the received amplitude modulation because the loop is capable of following and, therefore, compressing the modulation. However, when detector 17 indicates the presence of an acceptable signal, relay 19 is closed. The AGC loop now includes contact $R_8$, bandpass filter 16, contact $R_6$ to apply a signal which now comprises substantially only the carrier of the received signal to AGC generator 18. Damping circuit 21 is placed in the loop by contact $R_2$ making the loop stable despite its narrow bandwidth as shown by characteristics 24, 26 and 28 or FIG. 2. The AGC loop, however, responds only to the amplitude of the received carrier and is independent of modulation and noise. Since its response time need only vary slowly in order to follow the expected fading of the signal, the longer time constant introduced by damping circuit 21 is of no concern.

Figure 3:
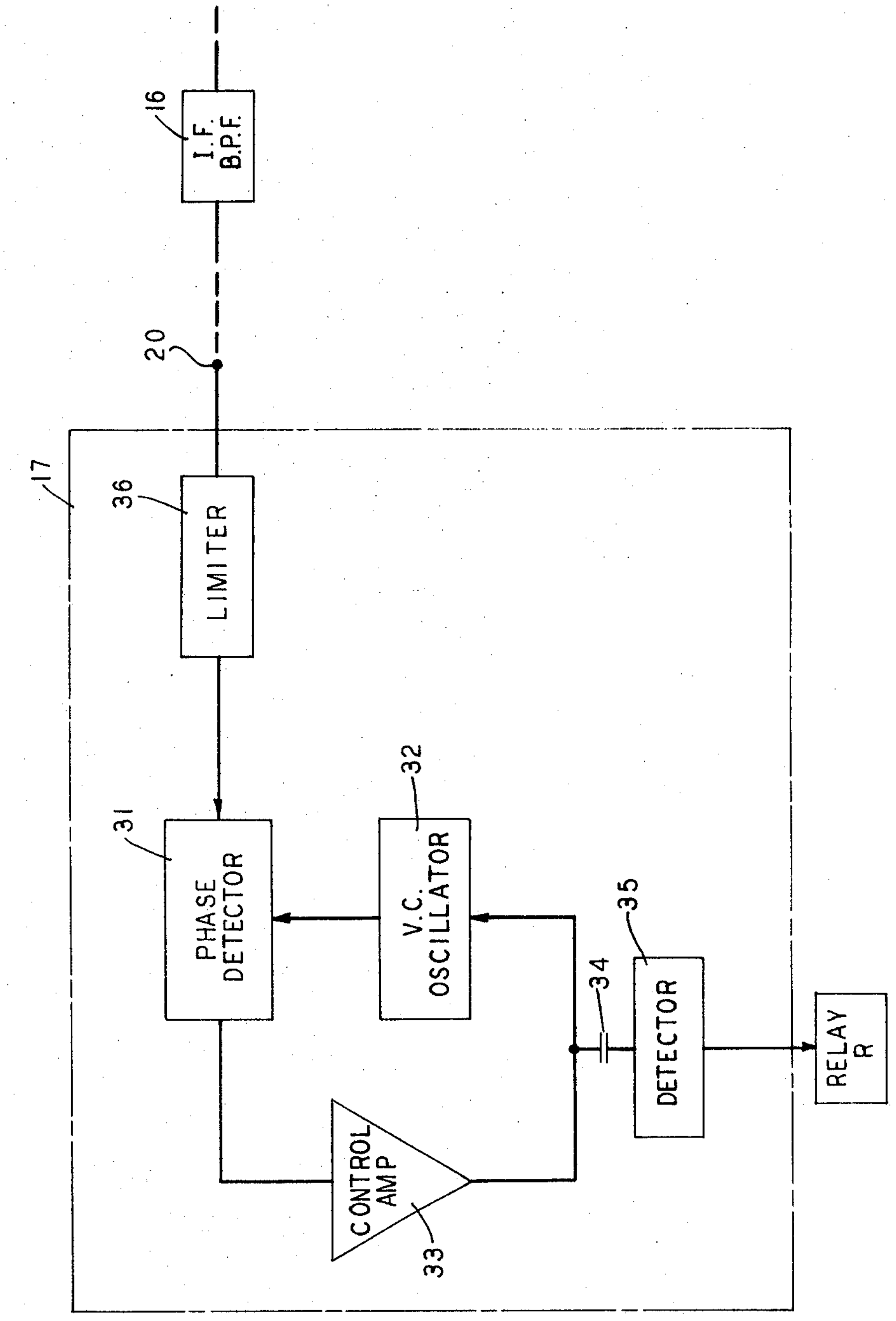
FIG. 3 shows in block diagram form a particular carrier to noise detector circuit for use in the combination of FIG. 1.

Referring now to FIG. 3 a carrier-to-noise ratio detector suitable for detector 17 of FIG. 1 is shown. The circuit utilizes the properties of a phase locked loop and has the particular advantages of accurate measurement, very fast operation and freedom from interference of sideband modulation. Thus, the narrow band (carrier) signal from point 20 is applied to a limiter 36 which removes any residual amplitude variation remaining after the basic AGC action. The output of limiter 36 thus comprises the carrier imbedded in a narrow band of noise. This signal is applied to phase detector 31 which generates an output voltage which is proportional to the phase difference between the carrier and a signal locally generated in voltage controlled oscillator 32. This output voltage, after being filtered and amplified by control amplifier 33 is applied to the control terminal of oscillator 32 to control the frequency thereof as is conventional in phase locked loops.

Recognizing that the effect of narrow band noise on the carrier is to impress a randomly varying envelope on the carrier amplitude, the noise envelope will perturb the zero crossings of the carrier sinusoid and thus affect the carrier phase. The magnitude of these perturbations will vary with the intensity of the narrow band noise. Thus, a "jitter" is produced in the output of control amplifier 33 which is directly related to noise intensity and is independent of modulation. This jitter is a low frequency and is band limited by the filter 16 described with reference to FIG. 1 in the AGC circuit. The alternating current jitter signal may then be removed from the fundamentally direct current control signal output of amplifier 33 via condenser 34, rectified by detector 35 and amplified to make the CODAN decision by comparing it with the threshold level of relay R.

What is claimed is:

1. An automatic gain control circuit for an amplifier in a radio frequency receiver comprising a negative feedback path responsive to the output of the amplifier for controlling the gain of said amplifier, means for determining the carrier-to-noise ratio in said output, and means for simultaneously decreasing the band width and increasing the time constant of said path when said ratio exceeds a predetermined value and for simultaneously increasing the band width and decreasing the time constant of said path when said ratio is below said value.

2. The combination according to claim 1 in which said means for determining the carrier-to-noise ratio in said output comprises, a voltage controlled oscillator and a phase detector in a phase locked loop configuration such that the output of said detector provides the control signal to said oscillator, means for driving said loop with a portion of said amplifier output, and means responsive to the alternating current component in said detector output for varying said band width and said time constant.

3. An automatic gain control circuit for an amplifier in a radio frequency receiver comprising a feedback path responsive to the output of the amplifier for controlling inversely the gain of said amplifier, means for determining the carrier-to-noise ratio in said output, a narrow pass band filter tuned to the carrier of said radio frequency, a low pass filter, and means for inserting said band pass filter and said low pass filter in said path when said carrier-to-noise ratio exceeds a predetermined value and for removing said filters when said ratio is below said value.

4. The combination according to claim 3 wherein said low pass filter is proportioned relative to said high band pass filter to reduce the gain of said feedback loop to below unity for frequencies at the upper band limits of said band pass filter.

5. The combination according to claim 4 including means in said path for converting the output of said amplifier into a direct current control signal and wherein said band pass filter is included in the portion of said loop containing said output and wherein said low pass filter is included in the portion of said loop containing said control signal.

6. An automatic gain control circuit for an amplifier in a radio frequency receiver comprising a feedback path responsive to the output of the amplifier for controlling inversely the gain of said amplifier, a narrow pass band filter tuned to the carrier of said radio frequency in said output, means for determining the carrier-to-noise ratio in the signal passing said filter, and means for inserting said filter in said feedback path when said signal-to-noise ratio exceeds a predetermined value and for removing said filter when said ratio is below said value.

7. The combination according to claim 6 including a switching matrix associated with said filter such that the output of said filter is delivered to said means for determining the carrier-to-noise ratio regardless of whether said filter is included in said feedback path.

* * * * *